United States Patent [19]

Baney et al.

[11] 4,314,956
[45] Feb. 9, 1982

[54] HIGH YIELD SILICON CARBIDE PRE-CERAMIC POLYMERS

[75] Inventors: Ronald H. Baney; John H. Gaul, Jr., both of Midland, Mich.

[73] Assignee: Dow Corning Corporation, Midland, Mich.

[21] Appl. No.: 171,556

[22] Filed: Jul. 23, 1980

[51] Int. Cl.$^3$ .............................................. F27B 9/04
[52] U.S. Cl. ....................................... 264/65; 501/88; 260/37 SB; 423/344; 423/345; 427/350; 427/387; 428/446; 428/447; 428/429; 556/430; 556/468; 528/28
[58] Field of Search ........................... 264/65; 106/44; 423/344, 345; 427/350, 387; 428/446, 447, 429; 260/37 SB; 556/430, 468; 528/28

[56] References Cited

U.S. PATENT DOCUMENTS 3,853,567 12/1974 Verbeek ................................. 106/44
4,052,430 10/1977 Yajima ................................. 556/431

*Primary Examiner*—Melvyn I. Marquis
*Attorney, Agent, or Firm*—Robert L. McKellar

[57] ABSTRACT

Pre-polymers which are aminated methylpolysilanes are useful for the preparation of fine grained silicon carbide ceramic materials and silicon carbide-containing ceramics. The pre-polymers exhibit ease of handling and their use to obtain silicon carbide ceramic materials results in high yields.

15 Claims, No Drawings

HIGH YIELD SILICON CARBIDE PRE-CERAMIC POLYMERS

BACKGROUND OF THE INVENTION

The concept of preparing silicon carbide ceramic materials or filled ceramics from silicon carbide ceramic materials is not new. As applied to the preparation of silicon carbide ceramic materials or filled ceramics from the degradation of polymers, any number of published articles or issued patents have appeared.

Yajima in U.S. Pat. No. 4,052,430, issued Oct. 4, 1977, has described the preparation of polycarbosilanes prepared by pyrolyzing the polysilanes generated by the reaction of sodium or lithium metal with dimethyldichlorosilane. These polycarbosilanes can be heated to yield beta-silicon carbide.

West and Maszdiazni reported in the 22nd AFOSR Chemistry Program Review FY77, R. W. Heffner ed. March (1978), that a polymer, made by reacting dimethyldichlorosilane with methylphenyldichlorosilane and an alkali metal, could be fired at high temperatures to yield whiskers of beta-silicon carbide.

Verbeek has shown in U.S. Pat. No. 3,853,567, the preparation of a mixed ceramic of silicon carbide and silicon nitride by pyrolyzing a polysilazane. In addition, Verbeek has prepared a polycarbosilane suitable for molding by heating organosilicon polymers optionally mixed with silicon dioxide or organic polymers at a temperature between 400° and 1200° C.

Rice et al., in U.S. Pat. No. 4,097,794 issued June 27, 1978, have suggested that almost anything containing silicon can be pyrolyzed to give a ceramic material.

Baney, in U.S. patent application Ser. No. 910,247, filed May 30, 1978, now abandoned, and continued as a continuation-in-part, serial number 024,137, filed Mar. 26, 1979, now abandoned and continued as a continuation-in-part of Ser. No. 135,567, filed Mar. 31, 1980 disclosed a methylhalopolysilane which can be fired at 1200° C. or higher to yield fine grain beta-silicon carbide ceramic materials. The yields and handling characteristics of these latter polysilanes were enhanced over the prior materials.

Finally, mention should be made of recent Japanese Patent Publication Nos. 80500/78 and 101099/78 in the name of Takamizawa et al. These publications deal with polymers made from methylchlorodisilanes but no mention is made of the yields of ceramic material generated by the decomposition of the disilane. Recent publications by Nakamura (Japanese Kokai Nos. 79/114600 and 79/83098 suggest that the preparation of silicon carbide precursor polymers having a silicon-carbon (—Si—C—Si) backbone are prepared by heating organosilicon compounds (including $(CH_3)_3SiSi(CH_3)_2Cl$) in the presence of B, Al, Si, Ge, Sn and Pb compounds or HI and its salts, at high temperatures.

It has now been determined that high yields of silicon carbide ceramic materials and filled ceramics can be obtained from the methods and the new materials of the instant invention.

THE INVENTION

This invention deals with a process for obtaining new and novel polysilanes which process consists of a method of preparing a polysilane having the average formula

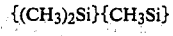
$$\{(CH_3)_2Si\}\{CH_3Si\} \qquad (I)$$

in which polysilane there is from 0 to 60 mole percent $(CH_3)_2Si=$ units and 40 to 100 mole percent $CH_3Si\equiv$ units, wherein there is also bonded to the slicon atoms other silicon atoms and radicals having the formula

—NHR wherein R is hydrogen or an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, 14 to 25 weight percent when R is hydrogen and either 0 to 25 weight percent chlorine or 0–35 weight percent total bromine, all based on the weight of the polysilane which method consists of (A) reacting under anhydrous conditions a polysilane having the average unit formula $$\{(CH_3)_2Si\}\{CH_3Si\} \qquad (II)$$

in which there is from 0 to 60 mole percent $(CH_3)_2Si=$ units and 40 to 100 mole percent $CH_3Si\equiv$ units, wherein the remaining bonds on the silicon atoms are attached to either another silicon atom, a chlorine atom or a bromine atom such that the polysilane contains from 10–43 weight percent, based on the weight of the polysilane, of hydrolyzable chlorine or 21–63 weight percent based on the weight of the polysilane of hydrolyzable bromine, with an aminolysis reagent having the general formula $NHR_2$ wherein R is hydrogen, an alkyl group of 1 to 4 carbon atoms or phenyl at a temperature of from 25° C. to 100° C. for a period of from 3 to 96 hours, in a suitable solvent, and (B) thereafter recovering the polysilane (I).

This invention also deals with a composition of matter which is a polysilane having the average formula

$$\{(CH_3)_2Si\}\{CH_3Si\} \qquad (I)$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen and either 0 to 25 weight percent chlorine or 0–35 weight percent bromine, all based on the weight of the polysilane.

Further, this invention deals with shaped articles made from the polysilanes, with, or without fillers, and a method by which the shaped articles are obtained.

This invention also consists of a method of preparing silicon carbide ceramic materials which consists of heating a polysilane having the average unit formula

$$\{(CH_3)_2Si\}\{CH_3Si\}.$$

in which polysilane there is from 0 to 60 mole percent $(CH_3)_2Si=$ units and 40 to 100 mole percent $CH_3Si\equiv$ units wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen and either 0 to 25 weight percent chlorine or 0 to 35 weight percent bromine, all based on the weight of the polysilane.

The inventions described herein represent an improvement over the art, in that, higher yields of silicon carbide ceramic materials are obtained upon pyrolysis of the polysilanes and the polysilanes herein are much easier and safer to handle because the replacement of the halogen substituents with —NHR radicals limits hydrolysis of the halogen to a certain extent and thus reduces the quantity of corrosive HCl or HBr gas liberated.

This invention results from replacing halogen atoms on the above described polyhalosilanes with amino radicals, the resulting product, upon pyrolysis, gives silicon carbide ceramic materials.

The polychlorosilane starting materials are those set forth and described in the Baney patent application Ser. No. 910,247, filed May 30, 1978, now abandoned, and continued as a continuation-in-part, Ser. No. 024,137, filed Mar. 26, 1979, now abandoned and continued as a continuation-in-part as Ser. No. 135,567, filed Mar. 31, 1980, which are hereby incorporated by reference.

The starting materials are those described in the Baney application which consist of 10-43 weight percent, based on the weight of the polysilane, of hydrolyzable chlorine or 21-63 weight percent, based on the weight of the polysilane, of hydrolyzable bromine.

These polyhalosilane starting materials can be prepared by treating methylhalodisilanes with catalysts such as $(C_4H_9)_4P^+Cl^-$ or, they can be prepared by treating halosilane residue which is derived from the Direct Synthesis of halosilanes. The aforementioned disilane is found in large quantities in the residue (See Eaborn, "Organosilicon Compounds", Butterworths Scientific Publications, 1960, pages 1).

The polyhalosilane starting materials are then subjected to a treatment with an aminolysis reagent in an anhydrous environment to obtain the inventive polysilane.

Generally, the process consists of placing a dry solvent solution of the starting polyhalosilane in a suitably equipped addition funnel and thereafter adding the aminolysis reagent directly into the reaction vessel as a liquid. The solution of polyhalosilane is then added to the aminolysis reagent. After the initial reaction has taken place, the reaction mass is stirred and sometimes heated to ensure complete reaction. It is then cooled and filtered. The resulting products are either solids or liquids depending on the starting materials.

These materials are then shaped (if desired), filled with ceramic type fillers (if desired) and fired to temperatures of 1200° C. or higher in vacuo or in an inert atmosphere to obtain silicon carbide ceramic materials or silicon carbide ceramic material containing ceramic articles.

Thus, this invention contemplates the preparation of a filled ceramic article prepared from the silicon carbide ceramic materials of this invention. The method consists of (A) mixing a polysilane with at least one conventional ceramic filler which polysilane has the average formula $\{(CH_3)_2Si\}\{CH_3Si\}$ in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen and either 0 to 25 weight percent chlorine or 0-35 weight percent bromine, all based on the weight of the polysilane, (B) forming an article of the desired shape from the mixture of polysilane and fillers and, (C) heating the article formed in (B) in an inert atmosphere or in a vacuum to an elevated temperature in the range of 1200° C. to 1600° C. until the polysilane is converted to a silicon carbide-containing ceramic.

It is also contemplated within the scope of this invention to prepare articles which are coated with the silicon carbide ceramic materials of this invention which are then pyrolyzed to give articles coated with silicon carbide-containing ceramics. Thus, the method of preparing such an article coated with ceramic consists of (A) mixing a polysilane with at least one conventional ceramic filler which polysilane has the average unit formula $\{(CH_3)_2Si\}\{CH_3Si\}$ in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen and either 0 to 25 weight percent chlorine or 0-35 weight percent bromine, all based on the weight of the polysilane; (B) coating a substrate with the mixture of polysilane and fillers and, (C) heating the coated substrate in an inert atmosphere or in a vacuum to an elevated temperature in the range of 1200° C. to 1600° C. until the coating is converted to a silicon carbide ceramic material, whereby a silicon carbide-containing ceramic coated article is obtained.

The treating reagents useful in this invention are ammonia or substituted or unsubstituted organic amines having the general formula

NHR$_2$.

Examples of materials useful in this invention are NH$_3$, CH$_3$NH$_2$, C$_4$H$_9$NH$_2$, (CH$_3$)$_2$NH and aniline. Most preferred are C$_4$H$_9$NH$_2$ and aniline.

Generally, the reagent is used in a stoichiometric excess based on the amount of halogen present in the polysilane (II) to ensure that the aminolysis reaction is enhanced. Excess reagent as well as any solvents and byproducts can be stripped or strip distilled at the end of the reaction.

It is contemplated within the scope of this invention to use a combination of reagents so as to vary the carbon content as desired.

For best results, dry reaction conditions should be observed.

Solvents for the starting polyhalosilanes can be any organic solvent in which the material is soluble and which does not react with the material except in the desired manner. Examples of useful solvents include toluene, xylene, benzene, tetrahydrofuran and ethers. Specifically, toluene is preferred.

Generally, the order of addition of the components is not critical, but it has been found preferable to add the neat reagent to the polyhalosilane in a solvent solution, such as toluene. This addition and reaction is carried out while the materials are stirred or otherwise agitated.

The reaction is carried out in a dry inert atmosphere such as in the presence of nitrogen or argon gas to prevent the introduction of water into the reaction vessel.

After the addition of the reagent is complete, the reaction mixture is stirred for a time, with or without heating, to ensure the completion of the reaction. The reaction can be run at temperatures of 25° to 100° C. but preferably the reaction is run at reflux temperature.

The reaction mixture is cooled to room temperature and then filtered by conventional means and the solvents and other volatile materials are then removed by stripping under vacuum with or without the addition of heat. The resulting polysilanes are liquids or solids depending on the polyhalosilane starting material and the reaction conditions used.

The resulting materials are then formed into shapes such as by melt spinning and fired at elevated temperatures to yield silicon carbide ceramic materials.

Filled silicon carbide ceramic materials can be made by adding fillers and adjuvants to the polysilane before firing.

For example, fine silicon carbide, silicon nitride, oxides, silica, glass, alumina and silicates can be used as fillers in the polysilanes of this invention and when the mixture is fired, high strength ceramic articles result. Preferred are powdered silicon carbide and silicon nitrides.

Fillers and adjuvants can be milled on 3 roll mills by simply mixing the polysilanes of this invention with the fillers and making several passes on the mill. The mixture is then shaped to the desired form and then fired to prepare the silicon carbide-containing ceramic article.

Usually, the materials of this invention, whether filled or unfilled, are heated to 1200° C. and above to ceramify them. Generally, 1600° C. is usually the hottest temperature required to convert the polysilanes to silicon carbide. Thus, heating the polysilanes from 1200° C. to 1600° C. will suffice to give optimum physical properties in the final ceramic product.

The following examples are given for purposes of illustration and are not intended to limit the scope of this invention.

Titration of chloride ion in these examples was carried out in a solution of toluene and isopropanol (essentially non-aqueous) using a 0.1% solution of tetrabromophenophthalein ethyl ester in methanol/toluene. Titration was carried out using 0.5 N KOH in ethanol.

The sodium peroxide digestion method used herein for halide analysis consists of a potentiometric titration, using standard silver nitrate, of a sample of halide-containing material which has been converted to soluble halides by fusion with sodium peroxide.

A typical analysis would consist of weighing a sample of approximately 0.25 mg of halide-containing polymer into a size 0 gelatin capsule and placing the capsule into a metal reaction cup which contains about 1.5 grams of Na$_2$O$_2$, 0.7 grams of KNO$_3$ and about 0.15 grams of sugar mixed together. The remainder of the cup is then filled with Na$_2$O$_2$. The entire cup and contents were loaded into a suitable reaction vessel (22 ml-assembly Reaction Vessel, Parr Instruments Co., Moline, Ill., Cat. No. AC3E). An ignition shield should be used! A suitable burner (blast oxygen, Bethlehem Apparatus Co., Hellertown, Pa., Cat. No. PM2C) is then ignited and heat applied to the reaction vessel for about one to one and one-half minutes. The reaction vessel is cooled by cold running water. The interior of the reaction vessel, including cap, and the reaction cup are then thoroughly rinsed with deionized water and the washings collected. Add 15 ml of cold 1:1 H$_2$SO$_4$ solution to the reaction cup for 15–20 sec. and then combine with the washings in the beaker. Add additional acid if the washings are not now acid. The titration is then carried out using 0.1 N silver nitrate using a reagent blank, using a glass reference electrode (Beckman Instruments, Inc., Fullerton, Calif., Cat. No. 41262) and a silver indicating electrode (Cat. No. 39261).

Materials were fired in a series 1000A water cooled graphite heated model 1000.3060-FP-12 Astro Industries furnace under an argon atmosphere generally at heating rates of 300°/hr to 300° C., 200° C./hr to 500° C., 100° C./hr to 700° C., and then 300°/hr to 1000° C. and finally as rapidly as possible to 2000° C. (usually 8 hours more).

EXAMPLE 1

1,2-dimethyltetrachlorodisilane was prepared according to the method shown by Watanabe et al., Journal of Organometallic Chemistry, 128 (1977) 173–175, utilizing 920 grams of distilled Direct Process residue, from the direct process for preparing chlorosilanes, and 67 grams of AlCl$_3$ at 150° C. for 24 hours under an argon atmosphere. Anhydrous hydrochloric acid was bubbled through the reaction mixture throughout the reaction time. The reaction mixture was distilled to obtain a colorless liquid with suspended white solid. The clear supernatant was decanted and treated with 30 mls of dry acetone. This mixture was distilled and the fraction boiling at 152°–160° C. was collected. This material was clear and light pink in color.

EXAMPLE 2

One hundred fifty grams of the above disilane and 1.5 grams of tetrabutylphosphonium chloride were placed in a round-bottomed flask which was equipped with a stirrer, thermometer and water-cooled condenser. Using an argon blanket, the reaction mixture was heated over 1 hour to 250° C. and held there ½ hour. A distillate was collected during this period of heating. A sample of the material was titrated for hydrolyzable chlorine content which was found to be 11.3%. Total chlorine in the polymer found by sodium peroxide digestion on a second sample was found to be 18.4%. The material thus has a formula of $(CH_3Si\equiv)_{1.0}Cl_{0.31}$.

EXAMPLE 3

A second polychloromethylsilane was prepared. One hundred fifty and six tenths grams of pure 1,1-dimethyltetrachlorodisilane and 1.45 grams of tetrabutylphosphonium chloride were heated under argon to 250° C. over a 1 hour period and held there for ½ hour. Upon cooling to room temperature, a sample of the polysilane was subjected to chloride analysis using a sodium peroxide digestion method. The sample contained 19.8 weight percent chlorine.

EXAMPLE 4

The polysilane materials from Examples 2 and 3 were combined and mixed and 37.7 grams of the mixture was dissolved in 39.4 grams of dry toluene. This material contained 19.8 weight percent chlorine (peroxide digestion). This solution was placed in a 3-necked, round bottomed glass flask equipped with an air stirrer, addition funnel and gas inlet tube. Aniline, 39.7 grams, was freshly distilled and placed in the addition funnel. The aniline was added dropwise to the silane solution and a white solid appeared as the reaction proceeded. Upon the completion of the addition, the mixture was allowed to stir for 3 hours. The reaction mixture was diluted with enough dry toluene to make about a 50% solids solution. The mixture was then filtered. The mixture was then evaporated to dryness under vacuum. The mixture was redissolved in ether and filtered and evaporated several times to remove residual salt. A sample of the material was analyzed for chloride content and it was found that the sample contained 8.89 weight percent chlorine. The mole ratio of $CH_3Si\equiv$ to phenylNHSi by 'H-NMR was found to be 1.0 to 0.082. The final polymer had an approximate formula of $(CH_3Si\equiv)_{1.0}(phenylNHSi)_{0.082}Cl_{0.230}$.

EXAMPLE 5

A chlorine containing polymethylsilane was prepared by weighing 475.4 gms of distilled direct process residue, (DPR), from the direct process for the preparation of chlorosilanes, into a 500 ml, 3-necked, round-bottomed glass flask. To this flask was added 5.0 grams of tetrabutylphosphonium chloride. The flask was equipped for distillation and used a stirrer, thermometer and condenser. Heat was applied to the flask and the temperature of the DPR was raised slowly to 250° C. while distillate was removed. The temperature was held for 1 hour. A sample of the resulting residual material was analyzed by titration, after cooling, and found to contain 11.1% hydrolyzable chlorine.

EXAMPLE 6

Into a 2 liter, 3-necked round bottomed flask was placed 176.6 grams of dry toluene and this solvent was chilled in a dry ice/isopropanol bath. Two times the volume of dry toluene of monomethylamine was added to the toluene to give a large stoichiometric excess (based on the chlorine present in the polysilane) of the amine. Under an argon blanket, the polychloromethylsilane of Example 5 as a 50% solution in dry toluene (136 grams) was added dropwise to the amine. After the addition, the reaction mass was stirred for ½ hour. The pot was then allowed to come to room temperature and the reaction mass was allowed to stir at room temperature for about 18 hours. The reaction mass was filtered and evaporated to dryness under vacuum. The material was pyrophoric when exposed to the air. It was a pale yellow solid.

EXAMPLE 7

A polychloromethylsilane was prepared as in Example 5 except that the final pot temperature was 150° C. and it was held there for 1 hour. The resulting polymer was analyzed by titration and was found to have 35.26 weight percent hydrolyzable chlorine. This material (164.3 grams) was diluted with 164.9 gms of anhydrous diethyl ether and 181.2 grams of this solution was placed in a 1 liter 3-necked, round bottomed flask which was equipped with an air stirrer, argon inlet tube, thermometer and an addition funnel. Freshly distilled normal butylamine (120.6 grams) was added very slowly dropwise to the polysilane. A vigorous reaction occurred. Two hundred seventy-five grams of anhydrous diethyl ether was added to the flask. A thick, white, gel-like substance formed when about ½ of the amine had been added. After the amine had been completely added, more ether was added to allow continued stirring of the reaction mixture. The reaction mass was allowed to stir for a few minutes and then allowed to stand for 96 hours whereupon it was suction filtered. Additional ether was required to aid filtration and Supercel ® was added to also aid filtration. The material was then refiltered and evaporated to dryness under vacuum. This material is a gummy yellow liquid. The material was analyzed for residual chlorine by titration and found to contain 1.55 weight percent. 'H-NMR showed a mole ratio of $(CH_3Si\equiv)$ to (n-butylamineSi) to be 1.0 to 0.42.

EXAMPLE 8

A polychloromethylsilane was prepared similar to that found in Example 5 wherein the reaction temperature was 250° C. and was held for 1 hour. The hydrolyzable chlorine content was approximately 11 weight percent. Dry toluene (82.8 grams) was added to an equal weight of the polymer and this material was treated as in Example 6, except the amine was n-butyl amine, to yield a thick, yellow, gelatinous mass. This material was redissolved in dry ether, filtered and evaporated several times to yield a bright yellow solid. This material was found upon titration to contain residual chlorine in the amount of 1.3 weight percent. 'H-NMR showed a ratio of $(CH_3Si\equiv)$ to nButylNSi of 1.0 to 0.086.

EXAMPLE 9

A polychloromethylsilane was prepared similar as in Example 5 except that the reaction temperature was 275° C. for 1 hour. A sample was titrated for hydrolyzable chlorine and found to contain approximately 11.0 weight percent.

Dry toluene (83.3 grams) was added to 83.3 grams of this polymer. Normal butylamine (38.2 grams) was added dropwise to the toluene solution. After work up, a sample was titrated for residual hydrolyzable chlorine and none was found. 'H-NMR showed the ratio of $CH_3Si\equiv$ to n-butylNSi to be 1.0 to 0.03.

EXAMPLE 10

A polychloromethylsilane was prepared as in Example 5 with the reaction temperature of 250° C. for 1 hour. This material contained 13.8 weight percent hydrolyzable chlorine. This material was heated with aniline using the process similar to that found in Example 3. After work up, this material had a mole ratio of $(CH_3Si\equiv)$ to $(C_6H_5NSi)$ of 1.0 to 0.06.

EXAMPLE 11

A chlorine-containing polymethylsilane was prepared as in Example 1 except that the temperature was held at 250° C. for 2 hours. A sample of this material was placed in a graphite crucible, in a process tube, in a Lindberg furnace. The process tube was flushed with a continuous stream of ammonia while the furnace was heated up to 1200° C. over 3 hours and held at 1200° C. for 2 hours.

The sample was cooled down overnight under a helium flow. The material in the crucible was analyzed. X-ray analysis indicates silicon carbide ceramic material was formed and even at 1200° C. the silicon carbide ceramic material was essentially amorphous with some incipient crystal formation. This result differs from the silicon carbide ceramic materials produced where there is no ammonia present and the firing is carried out in an inert gas. In the inert gas, crystalline material is formed at about 1000° C. and predominates the product.

EXAMPLE 12

The amino containing polymers from the examples were fired to silicon carbide ceramic materials or mixed silicon carbide/silicon nitride ceramic materials using an Astro furnace as described above. Weight retention, composition and grain size were determined for these examples. The firing schedule was as follows:

| | |
|---|---|
| room temperature to 300° C. | Very fast |
| 300° to 800° C. | 5 hours |
| 800° to 1600° C. | 1 hour |
| hold 1600° C. | Variable |
| 1600° C. to room temperature | Rapid |

The firing atmosphere was argon.
Results:

| Example | % weight retention | Grain Size |
|---|---|---|
| 4 | 50.0% | 38 ± 15 A |
| 6 | 62.9% | 185 ± 30 A |
| 7 | 16.7% | 735 ± 50 A |
| 8 | 49.1% | 67 ± 20 A |
| 9 | 53.4% | 630 ± 50 A |

These materials were all silicon carbide ceramic materials.

That which is claimed is:

1. A method of preparing a polysilane having the average formula $$\{(CH_3)_2Si\}\{CH_3Si\}(I)$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen and either 0 to 25 weight percent chlorine or 0–35 weight percent bromine, all based on the weight of the polysilane which method consists of (A) reacting under anhydrous conditions a polysilane having the average unit formula $$\{(CH_3)_2Si\}\{CH_3Si\}(II)$$

in which there is from 0 to 60 mole percent $(CH_3)_2Si=$ units and 40 to 100 mole percent $CH_3Si\equiv$ units, wherein the remaining bonds on the silicon atoms are attached to either another silicon atom, a chlorine atom or a bromine atom such that the polysilane contains from 10–43 weight percent, based on the weight of the polysilane, of hydrolyzable chlorine or 21–63 weight percent based on the weight of the polysilane of hydrolyzable bromine, with an aminolysis reagent having the general formula $NHR_2$ where R has the same meaning as above at a temperature of from 25° to 100° C. for a period of from 3 to 96 hours, in a suitable solvent, and (B) thereafter recovering the polysilane (I).

2. A method of preparing a polysilane as claimed in claim 1 wherein there is present at least a stoichiometric quantity of ammonia based on the amount of halogen in the polysilane (II).

3. A method of preparing a polysilane as claimed in claim 1 wherein there is present at least a stoichiometric quantity of an alkylamine based on the amount of halogen in the polysilane (II).

4. A method as claimed in claim 3 wherein the alkylamine is normal butylamine.

5. A method as claimed in claim 3 wherein the alkylamine is monomethylamine.

6. A method of preparing a polysilane as claimed in claim 1 wherein there is present at least a stoichiometric quantity of aniline based on the amount of halogen in the polysilane (II).

7. A composition of matter consisting essentially of a polysilane having the average unit formula $$\{(CH_3)_2Si\}\{CH_3Si\}$$

in which polysilane there is from 0 to 60 mole percent $(CH_3)_2Si=$ units and 40 to 100 mole percent $CH_3Si\equiv$ units, wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen, and either 0 to 25 weight percent chlorine or 0–35 weight percent bromine, all based on the weight of the polysilane.

8. A method of preparing silicon carbide ceramic materials which consists of heating a polysilane having the average unit formula {(CH$_3$)$_2$Si}{CH$_3$Si} in which polysilane there is from 0 to 60 mole percent (CH$_3$)$_2$Si≡ units and 40 to 100 mole percent CH$_3$Si≡ units wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen and either 0 to 25 weight percent chlorine or 0–35 weight percent bromine, all based on the weight of the polysilane.

9. Silicon carbide ceramic material prepared by the method as claimed in claim 8.

10. A method of preparing a silicon carbide-containing ceramic article which consists of
(A) forming an article of the desired shape from a polysilane having the average formula {(CH$_3$)$_2$Si}{CH$_3$Si} in which polysilane there is from 0 to 60 mole percent (CH$_3$)$_2$Si≡ units and 40 to 100 mole percent CH$_3$Si≡ units, wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen and either 0 to 25 weight percent chlorine or 0–35 weight percent bromine, all based on the weight of the polysilane; and
(B) heating the article formed in (A) in an inert atmosphere or in a vacuum to an elevated temperature in the range of 1200° C. to 1600° C. until the polysilane is converted to silicon carbide-containing ceramic.

11. The article prepared by the method of claim 10.

12. A method of preparing a ceramic article which consists of
(A) mixing a polysilane with at least one conventional ceramic filler which polysilane has the average formula {(CH$_3$)$_2$Si}{CH$_3$Si} in which polysilane there is from 0 to 60 mole percent (CH$_3$)$_2$Si≡ units and 40 to 100 mole percent CH$_3$Si≡ units, wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen and either 0 to 25 weight percent chlorine or 0–35 weight percent bromine, all based on the weight of the polysilane,
(B) forming an article of the desired shape from the mixture of polysilane and fillers and,
(C) heating the article formed in (B) in an inert atmosphere or in a vacuum to an elevated temperature in the range of 1200° C. to 1600° C. until the polysilane is converted to a silicon carbide-containing ceramic.

13. An article prepared by the method of claim 12.

14. A method of preparing an article coated with ceramic which consists of
(A) mixing a polysilane with at least one conventional ceramic filler which polysilane has the average unit formula {(CH$_3$)$_2$Si}{CH$_3$Si} in which polysilane there is from 0 to 60 mole percent (CH$_3$)$_2$Si≡ units and 40 to 100 mole percent CH$_3$Si≡ units, wherein there is also bonded to the silicon atoms other silicon atoms and radicals having the formula

—NHR wherein R is hydrogen, an alkyl radical of 1 to 4 carbon atoms or phenyl wherein essentially all the remaining bonds on silicon are attached to chlorine or bromine atoms such that the polysilane contains from 14 to 60 weight percent of —NHR when R is an alkyl radical, 14 to 66 weight percent of —NHR when R is a phenyl radical, from 14 to 25 weight percent of —NHR when R is hydrogen and either 0 to 25 weight percent chlorine or 0–35 weight percent bromine, all based on the weight of the polysilane;
(B) coating a substrate with the mixture of polysilane and fillers and,
(C) heating the coated substrate in an inert atmosphere or in a vacuum to an elevated temperature in the range of 1200° C. to 1600° C. until the coating is converted to a silicon carbide ceramic material, whereby a silicon carbide-containing ceramic coated article is obtained.

15. An article prepared by the method of claim 14.

* * * * *